United States Patent [19]

Malamas et al.

[11] Patent Number: 5,154,213
[45] Date of Patent: Oct. 13, 1992

[54] FUEL LINE ADAPTER FOR PORTABLE FUEL CONTAINERS

[76] Inventors: Strato Malamas, 1526 Kilmer Road, North Vancouver, B. C., Canada, V7K 1R2; Demitrios Malamas, 22 Flavelle Drive, Port Moody, B. C., Canada

[21] Appl. No.: 693,881

[22] Filed: May 1, 1991

[51] Int. Cl.$^5$ .............................................. F16L 15/00
[52] U.S. Cl. ........................... 141/382; 141/384; 141/387
[58] Field of Search ............... 141/7, 65, 35, 382, 141/383, 384, 385, 386, 387; 220/85 F

[56] References Cited

U.S. PATENT DOCUMENTS

| | | | |
|---|---|---|---|
| 2,680,546 | 6/1954 | Seaberg | 141/384 |
| 4,212,335 | 7/1980 | Bova | 141/382 |
| 4,332,044 | 6/1982 | Houk, Jr. | 141/382 |
| 4,665,960 | 5/1987 | Brzezicki et al. | 141/384 |
| 4,756,349 | 7/1988 | Atkins | 141/383 |
| 4,967,814 | 11/1990 | Day, Jr. | 141/384 X |

Primary Examiner—Ernest G. Cusick
Attorney, Agent, or Firm—Townsend and Townsend

[57] ABSTRACT

An adapter for a fuel container. The fuel container has an outlet/inlet and an annular cap to be received on the outlet/inlet. The cap has shoulder around the upper surface to overlap the inlet/outlet and the adapter comprises of a flange to be trapped between the outlet/inlet and the cap. A pipe mounting on the adapter allows a pipe to extend from the adapter towards the bottom of the fuel container. There is a passageway through the adapter so that the adapter can be trapped between the outlet/inlet and the cap to allow access to the fuel in the container. By this means, a jerry can need not be moved around within, for example, a boat fitted with an outboard motor. At the appropriate time the fuel line to the main supply tank for the motor can be disconnected from that main fuel tank and quickly attached to the adapter thus avoiding the possibility of fuel leakage.

3 Claims, 1 Drawing Sheet

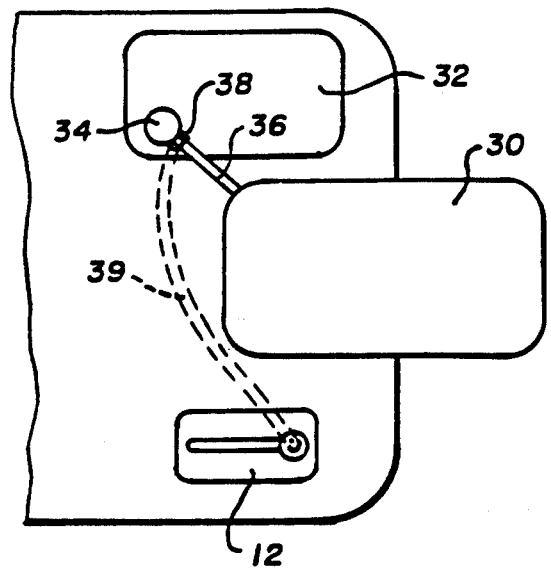
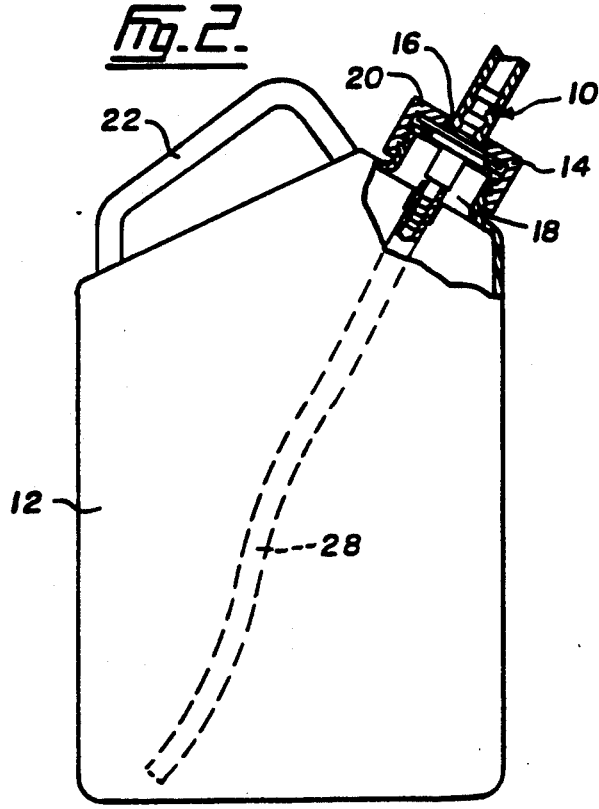
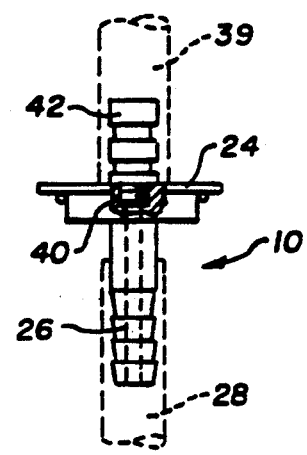

FUEL LINE ADAPTER FOR PORTABLE FUEL CONTAINERS

FIELD OF THE INVENTION

This invention relates to an adapter for a fuel container and finds particular application in supplying fuel to an outboard motor on a boat.

DESCRIPTION OF THE PRIOR ART

The driving of boats by outboard motors is extremely common. The fuel tank for such motors is relatively small and, in many case, can be carried by hand. There is a quick disconnect pipe extending from an inlet/outlet attachment on the tank to the carburetor of the motor. This arrangement has the advantage that the tank can be taken from the boat, filled at a gasoline pump, closed and returned to the boat. The fuel line from the engine is then easily attached by the quick disconnector attachment.

The above system has the great virtue of avoiding fuel spills and leakage. Fires in small boats are distressingly common and frequently stem from spilled fuel.

An outboard motor usually has good fuel economy. However, when the boat is to be used on a longer trip it is usual to take along a separate fuel container, frequently a jerry can, with additional fuel. When the properly designed and installed fuel tank is running low, it is filled from the jerry can. Modern jerry cans frequently have an annular cap received on the outlet/inlet opening for the jerry can and having a shoulder around the top surface to overlap the inlet/outlet. A flanged nozzle can be located within the container, when it is not required for use, by clamping its flange between the outlet/inlet and the annular cap. The nozzle can be closed off by inserting a disk above the flange of the nozzle and trapped against the nozzle by the shoulder of the annular cap. When it is desired to fill the tank from the jerry can, the annular cap of the jerry can is loosened, the disk is removed, the nozzle is removed from within the container and reversed. The flange on the nozzle is then again trapped between the outlet/inlet and the annular cap with the nozzle pointing upwardly. Gasoline may then be poured from the jerry can into the tank. The design of the jerry can nozzle is quite ingenious but the arrangement can still lead to fuel leakage. Gasoline is a volatile liquid and vapour generated within the jerry can can cause surging of the fuel and spillage. Furthermore, the nozzle may not be tightened properly which also leads to leaks.

SUMMARY OF THE INVENTION

The present invention seeks to solve the problems in transferring gasoline from a jerry can to a tank in a boat while maintaining the advantages of using the jerry can, a cheap and robust tank, as a means of secondary supply of fuel for an outboard motor.

Accordingly the present invention provides an adapter for a fuel container having an outlet/inlet and an annular cap to be received on the outlet/inlet, the cap having a shoulder around the upper surface to overlap the inlet/outlet top, the adapter comprising, a flange to be trapped between the outlet/inlet and the cap; a pipe mounting remote from the flange to allow a pipe to extend from the adapter towards the bottom of the fuel can; a passageway through the adapter whereby the adapter can be trapped between the outlet/inlet and the cap to allow access to the fuel in the container.

BRIEF DESCRIPTION OF THE DRAWINGS

The invention is illustrated in the drawings, in which:

FIG. 1 is a schematic arrangement according to the present invention;

FIG. 2 illustrates the invention in its useful position; and

FIG. 3 is a detail of FIG. 2.

DESCRIPTION OF THE PREFERRED EMBODIMENTS

The drawings show an adapter 10 for a fuel container 12. The fuel container 12 is of the type generally known as a jerry can and has an annular cap 14 with an opening 16 in its top to be received on an inlet/outlet 18 of the container 12. There is a shoulder 20 around the upper surface of cap 14 to overlap the top of inlet/outlet 18 providing a clamping system. The arrangement can be closed off by the provision of a disk (not shown) typically provided with the jerry can and the cap 14. The can has a handle 22.

The adapter 10 comprises a flange 24 to be trapped between the outlet/inlet 18 and the cap 14. As shown particularly in FIGS. 2 and 3, there is a pipe mounting 26 remote from the flange 14 to allow a pipe 28 (shown in broken lines in FIGS. 2 and 3) to extend from the adapter 10 towards the bottom of the container 12. There is a passageway through the adapter 10 so that the adapter 0 can be trapped between the outlet/inlet 18 and the cap 4 to allow access to the fuel. There is a seal, preferably, an O-ring as shown, beneath the flange 24 and the adapter 10 includes means to attach to a fuel line of an engine.

In this regard, FIG. 1 shows an outboard motor 30 and the tank 32 for the motor having an inlet/outlet 34 and a fuel line 36, attached at 38 by a quick disconnect fuel attachment. FIG. 1 also shows the fuel container 12 and a line 39 extending from the adapter 10 to the fuel line 36.

FIG. 3 shows that the means to attach to a fuel line can be a threaded opening 40 to receive a quick disconnect fuel attachment 42. These attachments differ from manufacturer to manufacturer. Accordingly, it is preferred that the adapter 10 simply include a threaded opening 40 to which any such adapter 10 can be attached by duplicating the standard adapter and providing it with a threaded male member to be received in the threaded opening in the adapter 10. Alternatively, the adapter 10 can be formed integrally with means to attach to a fuel line.

To use the adapter 10 according to the present invention, it may be located in a jerry can 12, appropriately filled with gasoline, and if required, the simple adapter shown in FIGS. 2 and 3 can be closed off with a safety disk on the upper surface of the flange 24 in a manner usual for closing off the open base of the nozzle normally used with the jerry can. Alternatively, if the means to attach to a fuel line is left in place on the adapter then these attachments frequently have means of preventing leakage. For example, they may include spring-loaded valves and the like, well known to those skilled in the art, that require external pressure to open and, when not in operation, provide an excellent seal.

To use the fuel within the jerry can when the tank 32 is running low, or has run dry, the quick disconnect fuel line 36 is removed from the main tank 32 and attached to the adapter 10 as shown in FIGS. 2 and 3. The jerry can 12 will first be prepared by removing the cap 14, removing the safety disk, if present, and inserting the quick disconnect fuel attachment into the threaded opening 40 of the adapter 10.

Alternatively, and preferably, the adapter 10 may have the means to attach to a fuel line always projecting from the jerry can and providing a gasoline seal. In this preferred aspect the adapter is provided with a receiver for a quick disconnect attachment so that the fuel line may be removed from the main tank 32 and transferred in a matter of seconds to the jerry can 12 and pressed into place. The risk of fuel leakage is negligible in these circumstances.

The adapter according to the present invention may be made of any gasoline resistant material. It may be made of plastic but may also be formed from brass, aluminum or the like.

We claim:

1. In combination (a) a fuel container having a bottom and a top with an inlet/outlet at the top and an annular cap having an upper and lower surface received on the inlet/outlet, the cap having a shoulder around the upper surface to overlap the inlet/outlet and (b) an adapter having an upper and a lower surface and comprising;
   a flange to be trapped between the inlet/outlet of the fuel container and the cap of the fuel container;
   a first, hollow tubular pipe mounting attached to the lower surface of the adapter;
   a pipe extending from the first pipe mounting towards the bottom of the fuel container;
   a second hollow tubular pipe mounting attached to the upper surface of the adapter; and
   a passageway through the adapter communicating the first and second pipe mountings.

2. The combination as claimed in claim 1 in which the adapter includes a seal beneath the flange.

3. The combination as claimed in claim 1 in which the second pipe mounting is threadedly attached to the adapter.

* * * * *